(12) United States Patent
Eschholz

(10) Patent No.: US 6,278,718 B1
(45) Date of Patent: *Aug. 21, 2001

(54) DISTRIBUTED NETWORK SYNCHRONIZATION SYSTEM

(75) Inventor: Siegmar K. Eschholz, Bourne, MA (US)

(73) Assignee: Excel, Inc., Hyannis, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/705,226

(22) Filed: Aug. 29, 1996

(51) Int. Cl.$^7$ ................................................. H04J 3/06
(52) U.S. Cl. ........................................... 370/503; 370/509
(58) Field of Search .................................. 370/503, 507, 370/508, 512, 517, 389, 506, 509, 510

(56) References Cited

U.S. PATENT DOCUMENTS

| | | | |
|---|---|---|---|
| Re. 31,852 | 3/1985 | Soderblom | 370/85.15 |
| 4,038,638 | 7/1977 | Hwang | 379/272 |
| 4,173,713 | 11/1979 | Giesken et al. | 370/65 |
| 4,228,536 | 10/1980 | Gueldenpfennig | 370/66 |
| 4,229,816 | 10/1980 | Breidenstein et al. | 370/100.1 |
| 4,456,987 | 6/1984 | Wirsing | 370/65.5 |
| 4,527,012 | 7/1985 | Caplan et al. | 379/284 |
| 4,539,676 | 9/1985 | Lucas | 370/60 |
| 4,569,041 | 2/1986 | Takeuchi et al. | 370/85.12 |
| 4,686,330 | 8/1987 | Hourton | 379/269 |
| 4,757,497 | 7/1988 | Beierle et al. | 370/85.12 |
| 4,805,172 | 2/1989 | Barbe et al. | 370/68.1 |
| 4,962,497 | 10/1990 | Ferenc et al. | 379/89 |
| 5,029,199 | 7/1991 | Jones et al. | 379/89 |
| 5,107,490 * | 4/1992 | Wilson | 370/404 |
| 5,119,370 | 6/1992 | Terry | 370/60.1 |

(List continued on next page.)

FOREIGN PATENT DOCUMENTS

| | | | |
|---|---|---|---|
| 0119105 | 9/1984 | (EP) . | |
| 0256526 | 2/1988 | (EP) . | |
| 0472380 | 2/1992 | (EP) . | |
| 2538662 | 12/1982 | (FR) . | |
| 2 693 333 | 7/1994 | (FR) | H04J/3/22 |
| 1243464 | 8/1971 | (GB) . | |
| 86/04203 | 7/1986 | (WO) | H04L/11/16 |
| 9416528 | 7/1994 | (WO) . | |

*Primary Examiner*—Douglas Olms
*Assistant Examiner*—Ricardo Pizarro
(74) *Attorney, Agent, or Firm*—Cesari and McKenna, LLP

(57) ABSTRACT

A distributed synchronization system for use in each node of a distributed asynchronous telecommunications network system that continually monitors and controls the flow of data through an implementing node to prevent dataflow errors due to phase and frequency differences in source and destination nodal clocks, and to control inter-nodal network latency so as to support the transmission of synchronous data. A synchronization data FIFO buffers predetermined fields or portions of fields of a unique frame packet received from a source node before retransmission to a destination node on the network. The frame packet includes a frame synchronization field indicating the beginning of a new frame packet; a payload field containing valid data; and a dead zone field providing bandwidth during which the present invention performs synchronization functions. A frame synchronization subsystem, implemented in a designated master node, guarantees that a frame is released at the beginning of an independently-determined frame regardless of network latency. A word resynchronization subsystem manages the flow of data through the data FIFO of each non-master node, receiving and storing data at the source node's clock rate and transmitting the data according to its own clock, thereby guaranteeing the efficient receipt and transmission of data between asynchronously-communicating nodes.

6 Claims, 11 Drawing Sheets

U.S. PATENT DOCUMENTS

| | | | |
|---|---|---|---|
| 5,241,543 | 8/1993 | Amada et al. | 370/100.1 |
| 5,282,200 * | 1/1994 | Dempsey | 370/522 |
| 5,327,425 * | 7/1994 | Niwa | 370/505 |
| 5,349,579 | 9/1994 | Madonna et al. | 370/58.2 |
| 5,452,305 * | 9/1995 | Nagatake | 370/516 |
| 5,473,610 * | 12/1995 | Rainard | 370/518 |
| 5,517,489 * | 5/1996 | Ogura | 370/223 |
| 5,517,505 * | 5/1996 | Buchholz | 370/508 |
| 5,544,163 * | 8/1996 | Madonna | 370/352 |
| 5,557,609 * | 9/1996 | Shobatake | 370/509 |
| 5,742,600 * | 4/1998 | Nishihara | 370/395 |
| 5,778,188 * | 7/1998 | Taniguchi | 395/200.66 |

* cited by examiner

DISTRIBUTED NETWORK SYNCHRONIZATION SYSTEM

CROSS-REFERENCES TO RELATED APPLICATIONS AND PATENTS

The following commonly-owned patents and applications are related to the present invention and are incorporated by reference by this and other references:

U.S. Pat. No. 5,544,163, entitled "Expandable Telecommunications System," naming as inventor Robert P. Madonna;

U.S. Pat. No. 5,426,694, entitled "Telecommunications Switch Having Programmable Network Protocols and Communications Services," naming as inventor Mark P. Hebert;

U.S. patent application Ser. No. 08/566,414, entitled "Telecommunications Switch Having A Universal Applications Program Interface," naming as inventor Mark P. Hebert, filed on Nov. 30, 1995; and U.S. Pat. No. 5,349,579, entitled "Telecommunications Switch With Programmable Communications Services," naming as inventors Robert P. Madonna and Kevin C. Kicklighter.

BACKGROUND OF THE INVENTION

1. Field of the Invention

This present invention relates generally to the field of telecommunications and, more specifically, to a distributed synchronization system for maintaining word and frame synchronization among asynchronous nodes of a distributed telecommunications system.

2. Related Art

Generally, a distributed network system includes a physical carrier transport system that transports data between geographically-distributed nodes. The network may take on any one of a number of architectural forms such as a bus or ring. In a bus topology, a coaxial cable or an optical fiber is commonly used as the physical carrier. Ethernet, for example, uses a coaxial cable as its transmission medium. In the case of a ring, the physical medium may be a twisted-wire pair, coaxial cable, or optical fiber. In a ring topology, nodes serve as repeaters, receiving and re-transmitting incoming information.

Various approaches have been developed to avoid conflicts between nodes using a shared medium in a network. For example, in one common technique, a token-passing distributed-control scheme is used, where permission to transmit is passed sequentially from one node or station to another by means of a "token," a specified bit or flag set in an information frame, or a specifically-defined control frame. Alternatively, a node currently engaged in transmitting over the medium may pass control to the next node upon conclusion of its transmission by setting a token bit in its transmitted frame. A node recognizing the token bit is then free to transmit its own information if it so desires. Thus, multiple tokens may simultaneously exist on the medium. In another conventional approach, a currently-transmitting node passes control to the next node (i.e., issues a token) only on the return of its own frame. In this case, there is only one token available at any one time, simplifying management of the network. Both bus and ring topologies may be used in conjunction with the token-passing approach. In the case of a bus, nodes are numbered in succession to permit unique identification of which node may next receive the token. In the case of a ring, the "next" node is implicit in the direction of transmission.

In the simplest mode of operation, each node on the ring receives each frame packet and then passes it on (retransmits it) to its neighbor. If a particular node recognizes the packet destination address as being its own, that node copies the frame in addition to retransmitting it. The original transmitting source node takes its own frame off the ring as it returns from one cycle around the ring. In the single-token procedure, a sending node passes control to the next node by issuing a token after receipt of its own frame packet. A node with a frame to transmit must wait until it receives the token before transmitting.

The time to transfer data from a source node to a destination node is typically used as a measure of network performance. The transfer time is dependent upon a number of factors, a significant one of which is ring latency or delay. There are two major contributors to ring latency: the propagation delay required for a frame packet to cycle once around the ring; and the delay required to retransmit a frame packet at each node on the ring. In general, reduced ring latency results in better network performance.

The effect of ring latency is compounded by the increased bandwidth capabilities provided in modem high-speed fiber optic systems. As high speed networks become faster due to the packing of bits closer together in the fiber, the time it takes for a single bit to traverse the fiber stays essentially the same. Thus, for example, it may take approximately the same time to exchange a message between applications on a high speed fiber optic network, which may be capable of operating at 2 Gb/s, as it does over a 10 Mb/s Ethernet network. However, the increased capability of the fiber optic network to send more bits per unit time, as well as the increased capability of nodes to perform more instructions per unit time, results in an increase in the relative delay in the network. That is, the number of instruction cycles that a source node must wait for a reply to its message increases as the node's CPU cycle time decreases. As a result, ring latency is becoming the largest contributor to the reduction of performance in distributed network systems.

This problem is exacerbated in widely distributed network systems since propagation delay increases with distance. As the nodes in a distributed network become more geographically distributed, the number of instruction cycles that a source node must wait for its packet to return, or for an answer to its message, increases. In addition, as the node-to-node distance increases in a geographically distributed network system, the propagation delay, and thus ring latency, becomes unpredictable. The unpredictability of distributed network systems is particularly problematic when the network is required to carry synchronous data such as pulse coded modulation (PCM) data commonly used in telecommunications networks. The unpredictable arrival of frame packets prevents the receiving node from accurately identifying the divisions between PCM samples, thereby inhibiting the transfer of synchronous data through the asynchronous network.

Furthermore, to ensure proper reception of information over a distributed network, local timing signals (i.e., clock signals) controlling a given destination node must be precisely matched to those of the source node. However, despite being designed to operate at the same frequency, timing variations inevitably exist among network components. High frequency variations, referred to as jitter, are typically reduced to manageable levels through the use of jitter filters in each node. Low frequency variations, referred to as wander, are typically dealt with through the use of buffers located within the nodes of the network. Specifically, these buffers store a small amount of data, allowing it to build up or be drained by small-magnitude wander without data loss or errors. When wander exceeds the capacity of the buffers, they either repeat (i.e., underflow) or discard (i.e., overflow) blocks of data to compensate for differences in timing between the source and destination nodes. Underflow and overflow conditions, generally referred to as slip, typically result in errors within the network. For example, in a voice circuit, slip may appear as popping or clicking sounds, whereas in data transmissions, slip is manifested by the loss of data. Very large buffers can reduce the probability of such errors, but they increase the delay through the network. Delay is undesirable, so buffer size is generally minimized.

Various techniques have been developed to maintain network synchronization and avoid such loss of data. For example, conventional synchronization techniques often require transmission of timing information through the network along with the data. A clock recovery system residing in a destination node uses the transmitted timing information to recover the frequency of the source node's clock and to generate a transmit clock having a frequency at which the destination node transmits the data to a destination user process. In addition, the recovered clock and data are provided to other nodes in the network. Regardless of the recovery technique, each node employs a phase-locked loop or other feedback circuitry that varies around the source node's clock frequency, continually adjusting to maintain lock on that frequency. This continual adjustment around the desired frequency causes jitter. As each subsequent node attempts to recover the clock, the jitter from all previous recovery attempts is accumulated. Eventually, this accumulated jitter may become too large, thereby resulting in data loss.

Another drawback to conventional clock recovery systems is that they are based upon the assumption that identical network reference clocks are provided to the source and destination nodes. This is often not the case in geographically-distributed telecommunications systems. It is not uncommon for each portion of a geographical-distributed telecommunications network to be synchronized to a different reference clock. Although those local clocks may be referenced to stratum 1 clocks, they may exhibit a phase difference over time that continues to increase until a slip in inter-nodal communications occurs. Moreover, if a network element such as a digital cross connect fails, certain network nodes may lose their reference clock. These nodes must then utilize their internal clocks, resulting in an increased loss of data due to the difference in phase and frequency between such nodes' internal clocks and the reference clocks.

What is needed, therefore, is a means for ensuring that the ring latency in a distributed network system is reliably controlled so as to support the transmission of synchronous data. In addition, the system must be capable of compensating for differences between source and destination nodes' clocks without loss of data and without causing excessive delays in the transmission of information across the network.

SUMMARY OF THE INVENTION

In brief summary, the present invention provides a distributed synchronization system for use in connection with a distributed, asynchronous, telecommunications network system that continually monitors and controls the flow of data through an implementing network node so as to prevent dataflow errors due to phase and frequency differences in source and destination nodal clocks.

Specifically, the present invention includes a synchronization data first-in-first-out (FIFO) memory for storing predetermined fields or portions of fields of a unique frame packet. The frame packet includes a frame synchronization field which marks the beginning of the frame packet; a payload field containing valid data; and a dead zone field which the present invention utilizes to perform synchronization functions. A frame synchronization subsystem of the present invention, implemented in a designated master node, operates such that a frame is released at the beginning of an independently-determined frame cycle regardless of the ring latency of the network.

A word resynchronization subsystem manages the flow of data through the data FIFO of each non-master node, receiving and storing the data at the source node's clock rate and re-transmitting the data at its own clock rate. Thus, the word resynchronization subsystem controls the operation of the synchronization data FIFO to effectively absorb any phase difference between the clocks of a source node and a destination node implementing the invention. A write controller, operating at the source node clock rate, and a read controller, operating at the destination node clock rate, asynchronously manage the passage of data through the data FIFO to maintain the level of data in the FIFO within an optimal range. During the receipt of a predetermined portion of a frame transmission which contains no valid data, the FIFO read and write controllers may temporarily suspend read and/or write operations from/to the FIFO to maintain the data level within the optimal range for efficient data transfer across the network.

Advantageously, the word resynchronization subsystem of the present invention prevents data FIFO overflow and underflow conditions from arising, thereby ensuring substantially error-free transmission through the implementing network node. A significant feature of the word resynchronization subsystem is its anticipatory nature, enabling it to compensate for phase differences between clock signals before data is lost. Another feature provided by the invention is the ability to momentarily control either or both the reading and writing of data from and to the FIFO to recover from clock deviations without loss of data and without causing substantial delays in the network.

The frame synchronization subsystem, on the other hand, buffers only the payload and frame synchronization fields of the frame packet, which are held until the beginning of a frame cycle, as determined by the occurrence of a local frame synchronization pulse. In response to that pulse, the frame synchronization subsystem transmits the frame synchronization and payload fields, onto which this subsystem appends a new, locally-determined dead zone to create a frame packet that is precisely one frame in length. This aspect of the present invention advantageously ensures that every non-master node receives a frame packet at predetermined intervals of time. In turn, such predictable and periodic receipt of frame packets enables the receiving nodes to precisely determine the boundaries between synchronous data samples contained within the frame packets. Furthermore, the frame synchronization subsystem automatically adjusts the amount of data buffered in the master node, dynamically self-adjusting to changes in the ring latency which may be caused, for example, by the addition (or deletion) of nodes to the network.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENTS

A. System Environment

Figure 1:
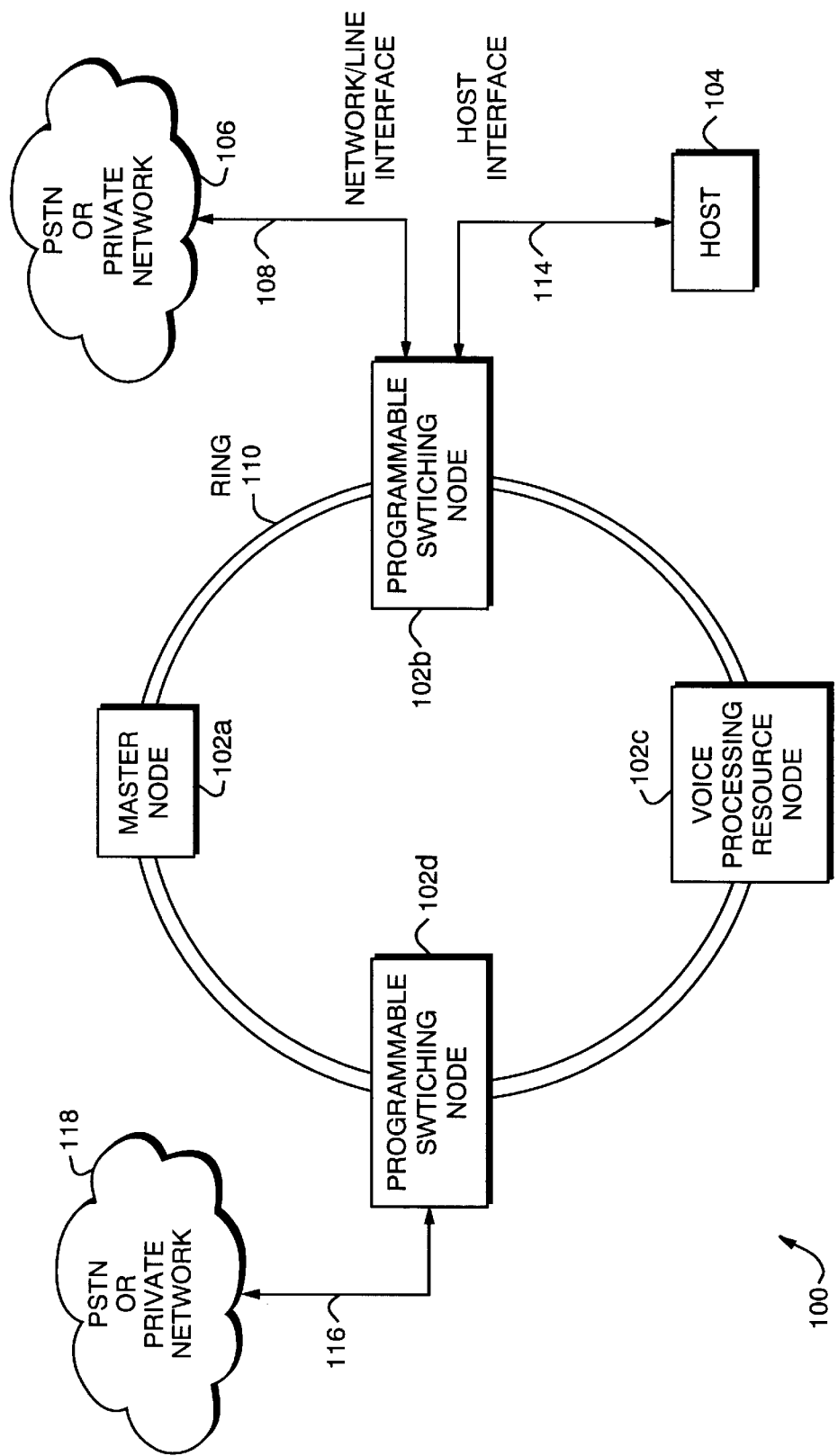
FIG. 1 is a block diagram of an expandable telecommunications system which employs a ring-type inter-nodal network to transfer information between nodes, all of which is constructed in accordance with a preferred embodiment of the present invention.

FIG. 1 shows a large capacity, expandable, fully programmable telecommunications switching network system 100. The network system 100 includes a series of programmable nodes 102 interconnected by a ring-architecture, inter-nodal network 110. The programmable nodes include a master node 102a, programmable switching nodes 102b, 102d, and a voice processing resources node 102c. A host link 114 connects node 102b in communicating relationship with a host computer 104. Nodes 102a, 102c and 102d may be controlled by host computer 104, whether by additional host links to such nodes, by passing control information over inter-nodal network 110 or by separate host devices. Although only a single host computer 104 and host link 114 are shown for purposes of improved clarity, use of a local area network (LAN) to provide host/node communications permits multiple hosts to control the system 100 (or parts thereof) by configuring each host as a "client" and each node as a "server."

The nodes may perform any number of functions. For example, nodes 102b and 102d are switching nodes and include desired network/line interfaces for connection, respectively, with a public switched telephone network (PSTN) or a private network 106 and 118, respectively. The term "private network" is intended in a broad sense to refer to any network or line or other interface other than the PSTN. Network/line interfaces 108, 116 may terminate either digital networks or analog trunks/lines, or combinations of both types.

Node 102a is nominally designated a "master node," the significance of which is described below. As noted below, any of nodes 102a–102d may be configured as the active master node. However, at any given time, there may be only one active master node.

Inter-nodal network 110 provides for high speed, high bandwidth digital communications among nodes 102a–102d. Inter-nodal network 110 may be implemented using one or more fiber optic rings which enable each of the nodes to exchange packetized information with each other node served by network 110. Inter-nodal network 110 may also be implemented with any of a variety of other types of communications networks, including Ethernet or other types of LANs, wireless communications networks or the PSTN (ATM/SONET). Using the PSTN for inter-nodal network 110, for example, permits the nodes to be geographically distributed over large areas. Furthermore, other inter-nodal network topologies, such as a bus topology, are contemplated by the present invention.

The overall operation of system 100 is controlled by host 104, which is commonly implemented with a personal computer (PC), workstation, or other computer on which a user's application software runs. Host 104 and node 102b exchange messages over host link 114. Such messages are typically used to configure the node as well as direct call processing functions such as making connections and providing communications services (i.e., tone detection, tone generation and conferencing). Descriptions of exemplary programmable network protocols and communications services supported by nodes 102, as well as the development of such protocols, may be found in commonly owned U.S. Pat. No. 5,426,694 to Mark P. Hebert, entitled "Telecommunications Switch Having Programmable Network Protocols and Communications Services," and U.S. patent application of Mark P. Hebert, entitled "Telecommunications Switch Having A Universal Applications Program Interface," filed on Nov. 30, 1995, Ser. No. 08/566,414.

Figure 2:
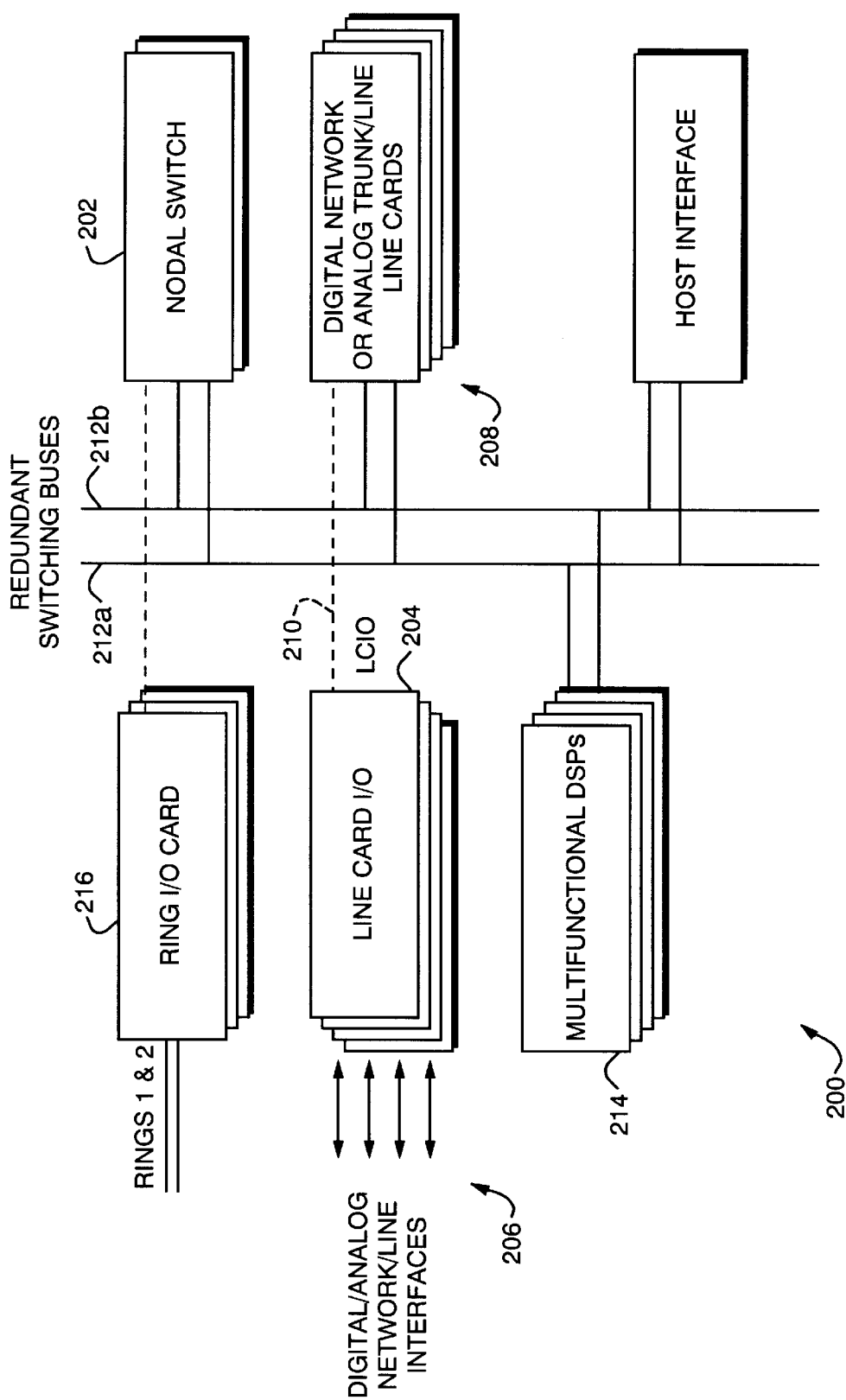
FIG. 2 is a block diagram of one type of programmable switching node that may be used in the telecommunications system of FIG. 1.

FIG. 2 shows the major functional components that may be contained in one type of node which may be used in system 100, programmable switching node 102b. Digital or analog network/line interfaces 206 are terminated on a series of line card input/output (IO) cards 204. A series of digital network T1, E1, J1 or analog trunk/line line cards 208 communicate with line card IO cards 204 over line card (LC) IO lines 210. Line cards 208 are also interfaced with redundant switching buses 212a and 212b (collectively and generally referred to as switching buses 212). Other types of network/line interfaces (and related line cards) such as DS3, SONET, SS7, ISDN or others may also be provided.

Diverse communications services such tone detection and generation, conferencing, voice recorded announcements, call progress analysis, speech recognition, ADPCM compression and many others are provided by one or more multifunction digital signal processing (MFDSP) cards 214. Details of the architecture and operation of MFDSP cards 214 and other optional cards, as well as buses 212, are disclosed in commonly owned U.S. Pat. No. 5,349,579. A ring (network) IO card 216 serves as an interface between inter-nodal network 110 and a nodal switch 202 of the present invention. A host interface may be provided as noted above to establish a communication link with host 104. It should be understood that other cards may be added to or removed from the illustrative switch 102b.

In contrast to switching node 102b, voice processing resource node 102c (FIG. 1) does not necessarily include line cards 208 and line card IO cards 204 since such a node need not interface with a PSTN or other network. However, such nodes may include additional components, such as a standard voice processing buses for communicating with, for example, voice processing resources. For example, Dialogic Corporation of New Jersey produces a family of voice processing resource boards or cards which plug directly into certain standard voice processing buses and may be used in diverse applications including voice mail, fax mail, interactive voice response and others.

Figure 3:
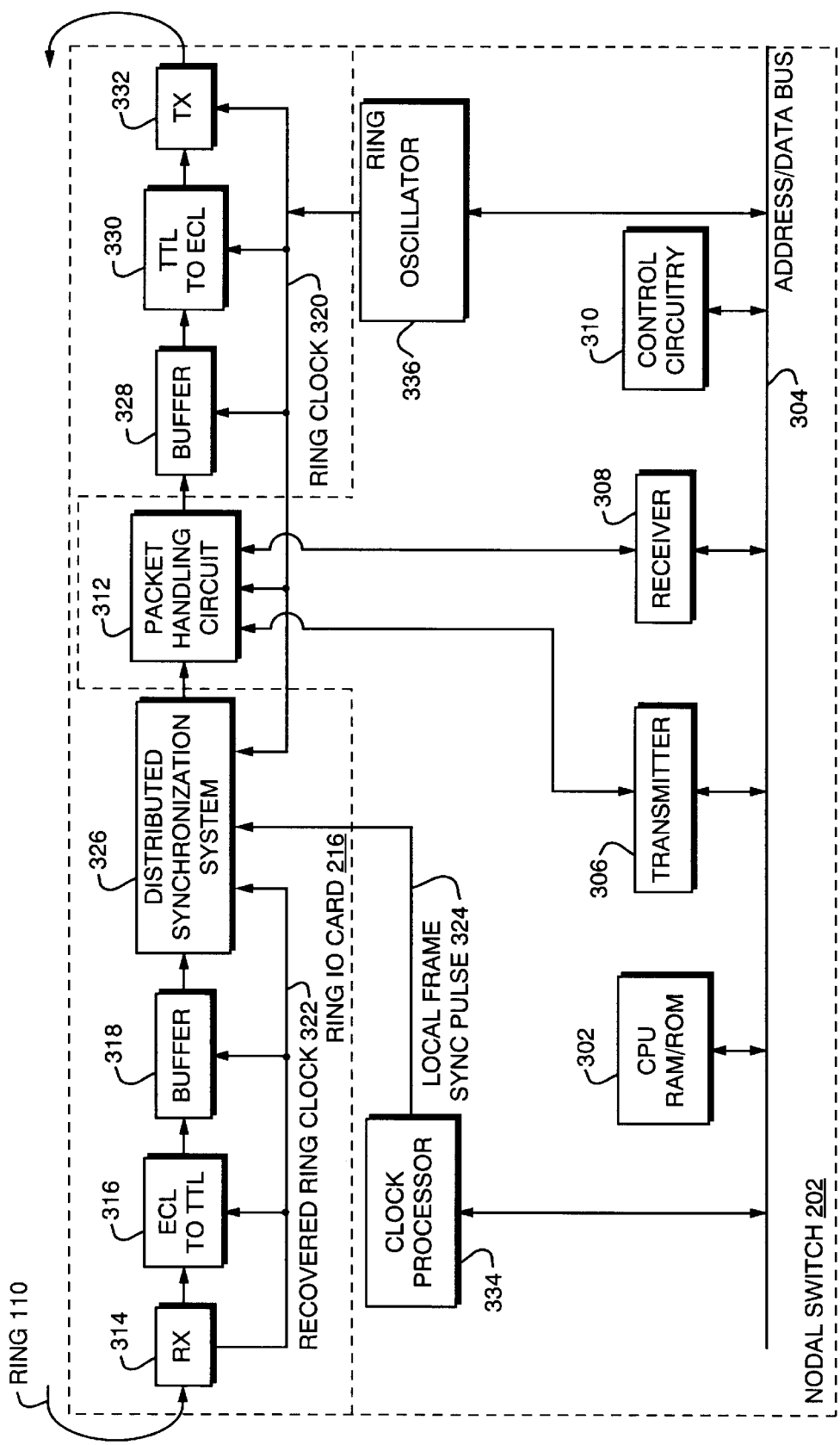
FIG. 3 is a block diagram of the nodal switch incorporated in the switching node illustrated in FIG. 2.

The detailed construction of a preferred embodiment of nodal switch 202 and ring IO card 216 of the present invention is shown in FIG. 3. A central processing unit (CPU), with associated RAM/ROM, 302 is connected in communicating relationship with an address/data bus 304. CPU 302 is also connected in communicating relationship with an HDLC bus (part of switching buses 212) for communication with other cards within the node and may, depending upon the configuration of nodal switch 202, also be connected in communicating relationship with host 104. A data transmitter 306 and data receiver 308 are connected in communicating relationship with address/data buses 304 and a packet handling circuit 312.

A high speed data receiver 314 is physically interfaced with inter-nodal network 110 for receiving information in the form of optical signals from that ring. Receiver 314 is preferably implemented with a Hewlett-Packard Company HDMP-1014 receiver chip, which is an emitter coupled logic (ECL) device. Conversion circuit 316 is connected to receive the output signals of receiver 314 and produce output signals that are compatible with transistor-transistor logic (TTL). The output of conversion circuit 316 is applied, through a buffer 318, to the distributed synchronization system 326 of the present invention. The output of system 326 is applied to packet handling circuit 312 that transfers data to/from data receiver 308 and data transmitter 306, respectively. A buffer 328, conversion circuit 330, and high speed data transmitter 332 perform functions which are complementary to those of buffer 318, conversion circuit 316 and data receiver 314, respectively. Transmitter 332 is preferably implemented with a Hewlett-Packard Company HDMP-1012 transmitter chip.

Receiver 314 includes circuitry which recovers a source node's clock signal from a received transmission and distributes it as a recovered ring clock 322 to the components of the nodal switch 202 dedicated to receiving frame packets, including the distributed synchronization system 326 of the present invention. A clock processor 334 that generates a local frame synchronization pulse 324 for use by the distributed synchronization system 326. Local frame synchronization pulse 324 is derived from a network reference clock provided to the implementing node, typically from the PSTN or a private network.

A ring oscillator 336 generates a local ring clock 320 used by the components of nodal switch 202, including distributed synchronization system 326, to transmit frame packets. Further details of the structure and operation of nodal switch 202 may be found in commonly owned U.S. Pat. No. 5,544,163.

B. Distributed Synchronization System

1. In General

To ensure that the ring latency of the distributed network system 100 does not interfere with the transmission of synchronous (PCM) data, the present invention operates to delay the retransmission of a given frame packet until the occurrence of a predetermined frame synchronization signal (pulse), thereby dynamically adjusting the ring latency to an integer number of frame cycles. To avoid dataflow errors due to clock deviations between asynchronously-communicating nodes, the present invention performs the receive and retransmit functions asynchronously, maintaining the data throughput at an optimal rate to prevent dataflow errors while avoiding excessive increases in ring latency.

For the purpose of maintaining both word and frame synchronization between geographically-distributed nodes of an asynchronous network, the present invention comprises two related, yet functionally distinct, subsystems: a frame synchronization subsystem operating in a designated master node; and a word resynchronization subsystem operating in the remaining (non-master) nodes. Each subsystem works in conjunction with a unique frame packet discussed in detail below.

Figure 4:
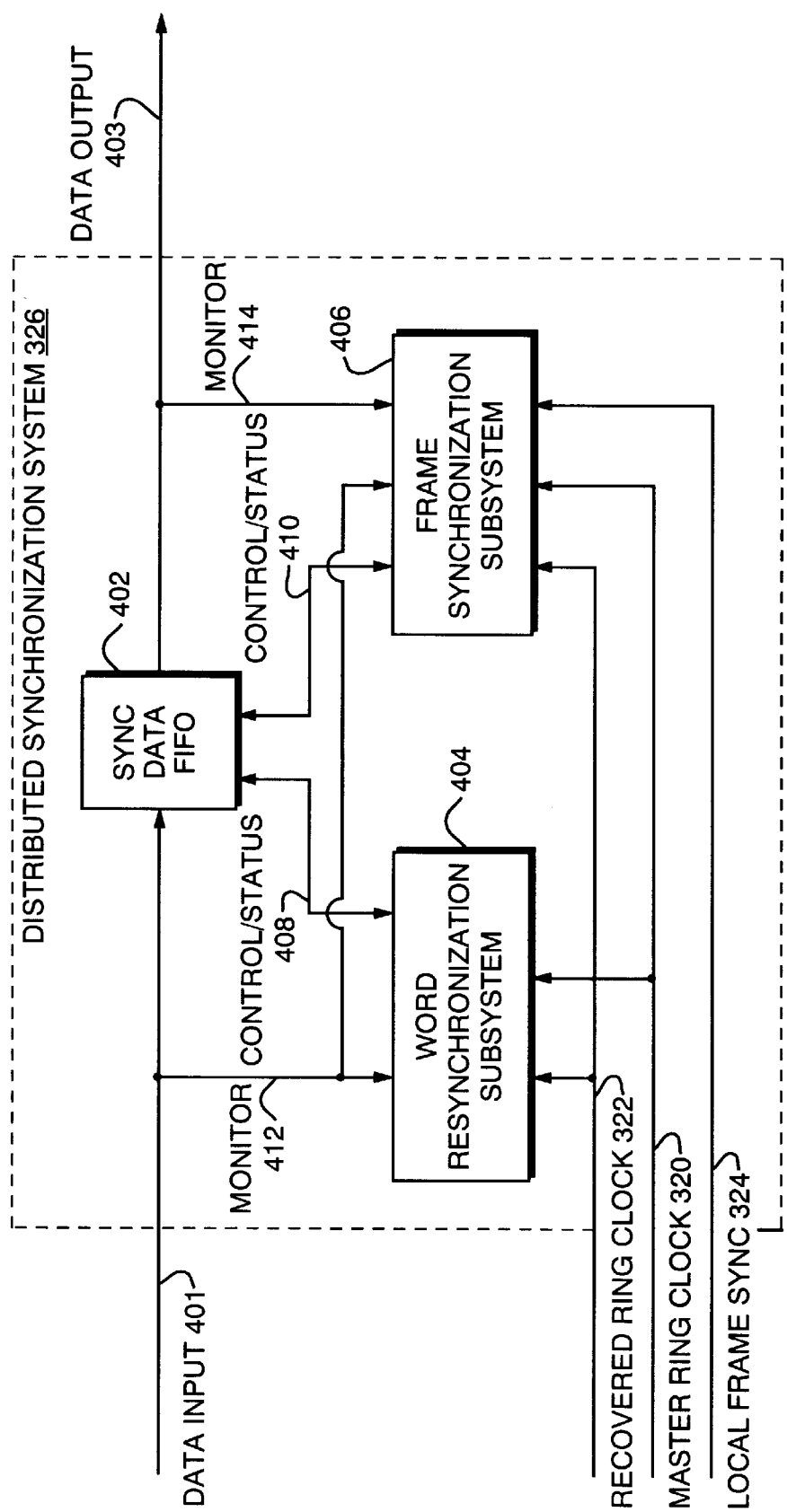
FIG. 4 is a block diagram of the distributed synchronization system of the present invention.

Referring now to FIG. 4, the preferred embodiment of the distributed synchronization system 326 comprises a synchronization data FIFO 402, a word resynchronization subsystem 404 and a frame synchronization subsystem 406. Asynchronous data in the form of frame packets 502 (FIG. 5A) arrive on data input line 401 and are written into data FIFO 402. Data which is read from data FIFO 402 appears on a data output line 403.

Word resynchronization subsystem 404 monitors, via line 412, frame packets presented to the input of data FIFO 402. Subsystem 404 also monitors the level of data in the data FIFO 402 and controls the writing of the presented frame packets into the data FIFO 402 via a control/status line 408. Subsystem 404 also receives as inputs recovered ring clock 322 to control the writing of data into the data FIFO 402; and a local ring clock 320 to control the reading of data from data FIFO 402.

Frame synchronization subsystem 406 also monitors the frame packets presented to the data FIFO 402. Subsystem 406 also monitors the level of data in the data FIFO 402 and controls the reading and writing of frame packets into the data FIFO 402 via the control/status line 410. Since subsystem 406 also asynchronously performs the reception and retransmission of frame packets, it receives as inputs the recovered ring clock 322 and local ring clock 320, both of which are utilized for similar purposes as in the word resynchronization subsystem 404. In addition, subsystem 406 receives the local frame synchronization pulse 324 that it uses to transmit the frame packets from FIFO 402.

Figure 5:
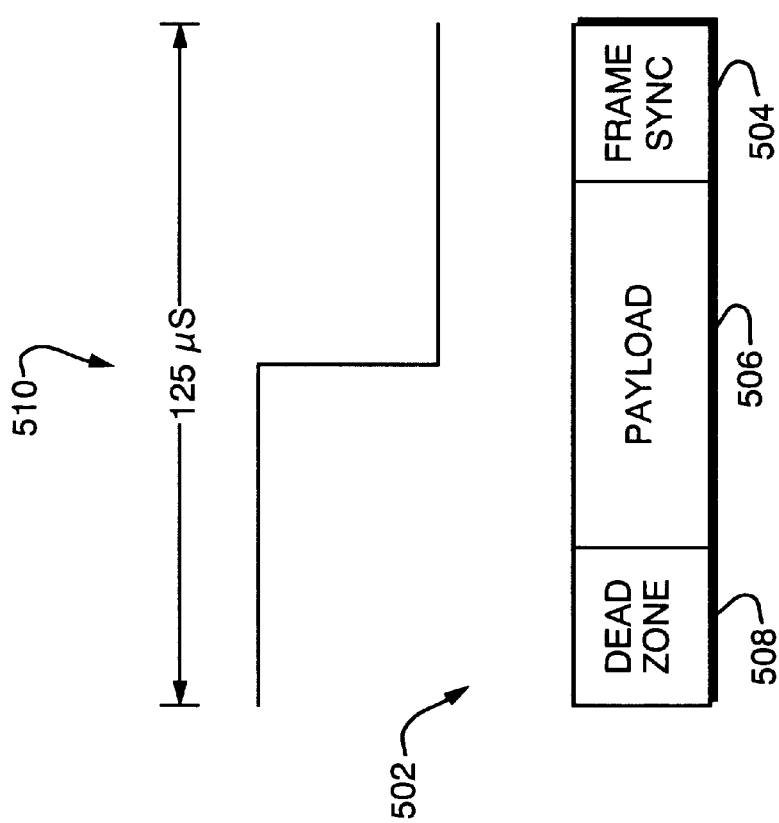
FIG. 5 is a block diagram showing the novel frame structure utilized by the distributed synchronization system of the present invention.

FIG. 5A shows a general structure for a frame packet 502 for exchanging information over the inter-nodal network 110. Each frame packet 502 comprises a number of fields, each containing one or more words of data, control information or fill frames (i.e., non-data). A frame synchronization field 504 provides an indication of the beginning of a frame packet 502. A payload field 506 comprises a number of subpackets, each containing data for transmission among nodes served by inter-nodal network 110. Payload field 506 may contain any type of data within its subpackets, including circuit switched data, packet switched data, voice processing data and others. A dead zone field 508, which does not contain valid data and whose length or duration is dynamically-adjustable, is used for synchronization purposes as described below. Additional information regarding the structure of the subpackets as well as details of various packet structures for transferring different types of information, is described in commonly owned U.S. Pat. No. 5,544,163.

FIG. 5B, in conjunction with FIG. 5A, illustrates a preferred approach for allocating the bandwidth of inter-nodal network 110 for the purpose of transferring data among nodes. Transfer of data over the network is preferably made within framing windows 510, each of which is 125 $\mu$s in duration. A period of 125 $\mu$s is preferred since it corresponds with the sampling rate (8 kHz) of most widely used circuit switched network protocols, meaning that the values of circuit switched data may change every 125 µs. Thus, by requiring that all inter-nodal transfers of circuit switched data take place in less than 125 µs, inter-nodal network 110 ensures that all such data is transferred before any value changes. This also permits inter-nodal network 110 to operate asynchronously with respect to the PSTN or private networks 106,118 (FIG. 1).

2. Word Resynchronization Subsystem

Figure 6:
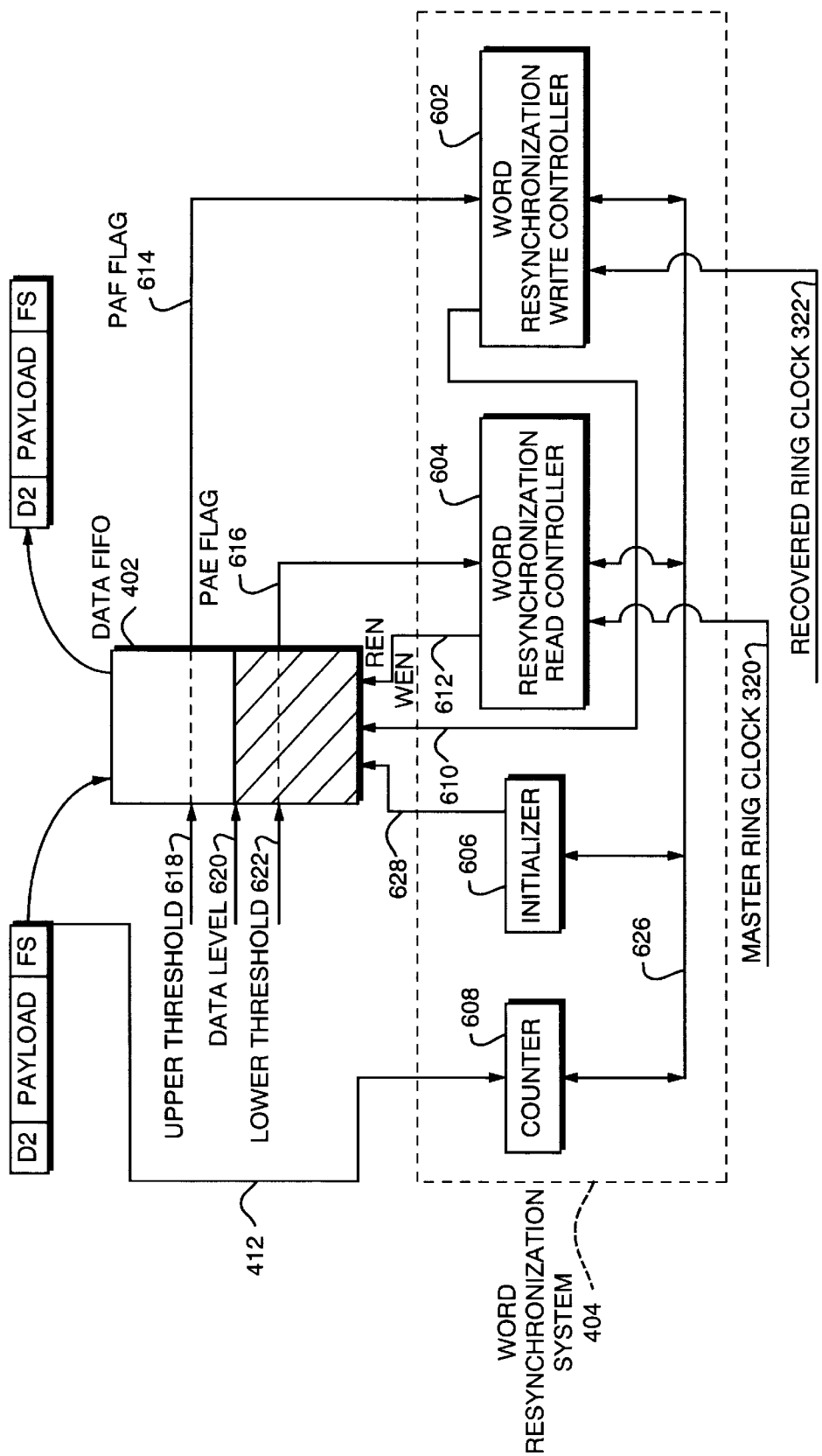
FIG. 6 is a block diagram showing the word resynchronization subsystem of the distributed synchronization system of the present invention.
Figure 7:
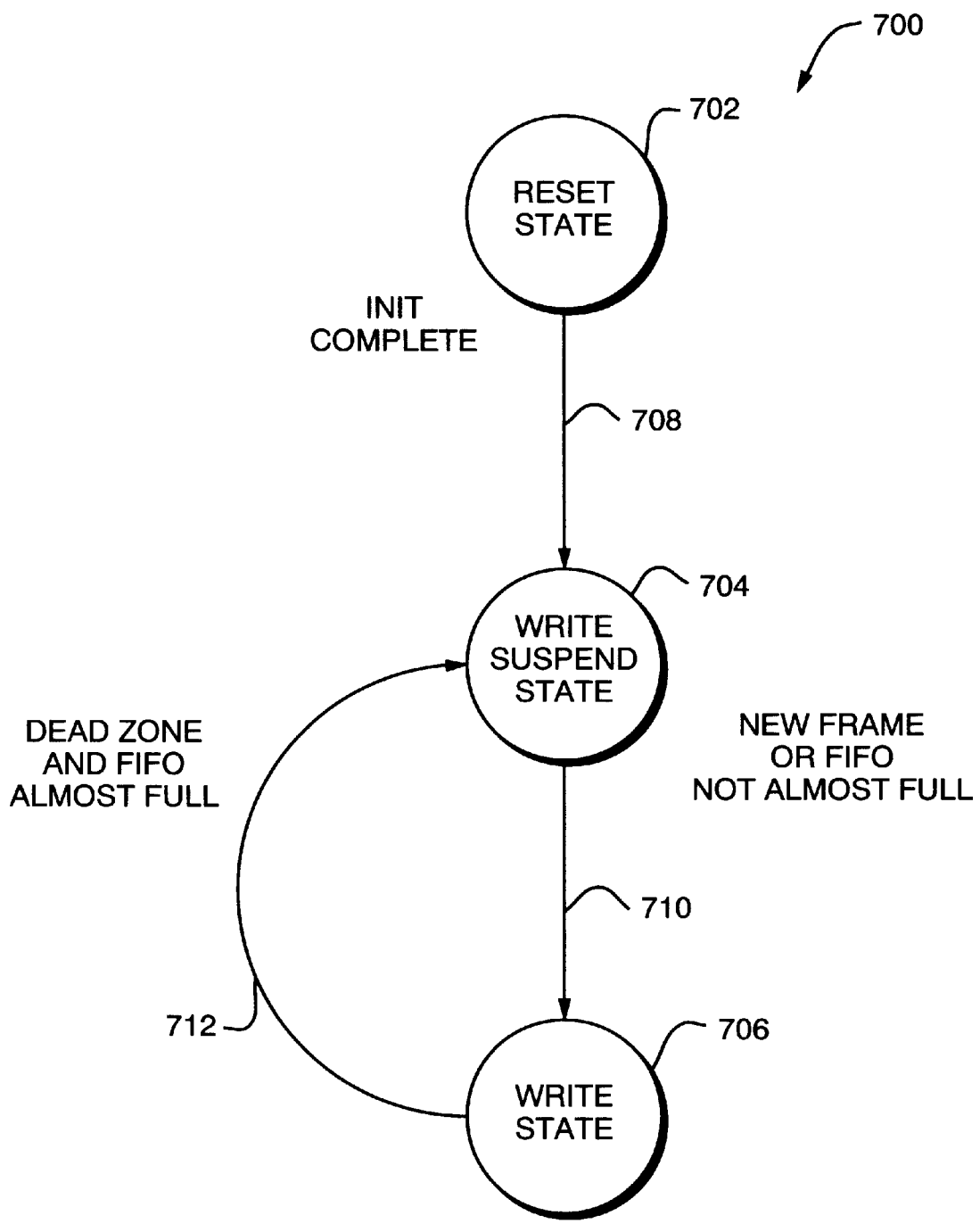
FIG. 7 is a state diagram illustrating the functions performed by the write controller of the word resynchronization subsystem of the present invention.
Figure 8:
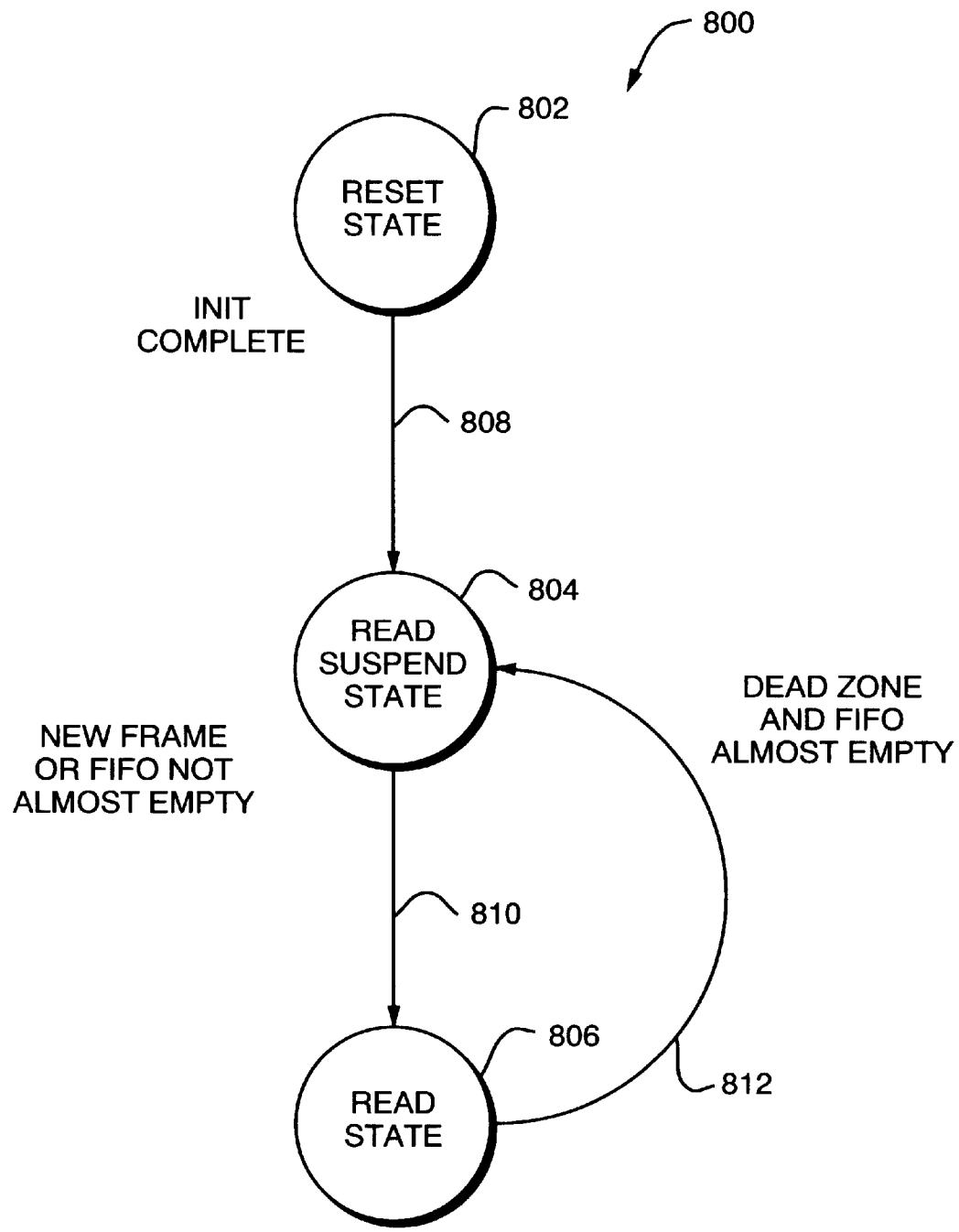
FIG. 8 is a state diagram illustrating the functions performed by the read controller of the word resynchronization subsystem of the present invention.

With reference now to FIGS. 6–8, the detailed operation of word resynchronization subsystem 404 is described. FIG. 6 is a functional block diagram of the word resynchronization subsystem 404 and data FIFO 402 of the distributed synchronization system 326 of the present invention. The word resynchronization subsystem 404 generally includes a write controller 602, a read controller 604, an initializer 606 and a counter 608 connected in communicating relationships by a control bus 626. Write controller 602 controls the writing of data into the data FIFO 402 via a write enable (WEN) signal line 610. Read controller 604 controls the reading of data from data FIFO 402 via a read enable (REN) signal line 612.

Write controller 602 and read controller 604 control the flow of data through data FIFO 402 in response to a time-varying data level 620 of the FIFO as well as which field of a frame packet 624 is currently present at the input of data FIFO 402. More specifically, the controllers 602,604 cooperate to maintain data level 620 between an upper threshold level 618 and a lower threshold level 622. Thresholds 618,622 are preferably chosen to define an optimal range of data level 620 to absorb phase differences between the clocks of the source node and the destination node without contributing excessively to ring latency. Upper threshold level 618 is preferably represented by a programmable almost full (PAF) flag 614, while the lower threshold level 622 is preferably represented by a programmable almost empty (PAE) flag 616. Together, the two flags 614,616 provide a current indication of the data level 620.

PAE flag 616 indicates when data level 620 is below the associated lower threshold level 622. Similarly, PAF flag 614 indicates when data level 620 is above the associated upper threshold level 618. When data level 620 is at or below the lower threshold 622, PAE flag 616 is in its active state whereas when the data level 620 is at or above the upper threshold 618, PAF flag 614 is in its active state. Alternatively, when data level 620 is above lower threshold 622 and below upper threshold 618, the PAE and PAF flags are both inactive. Thresholds 618 and 622 are initially set by initializer 606 via initialization control line 628 to predetermined levels.

As noted above, frame packet 624 comprises a number of fields. The operations performed by word resynchronization subsystem 404 depend, in part, upon which field of the frame packet 624 is present at the input to data FIFO 402. This is determined by counter 608 via monitor line 412. Upon receipt of a frame synchronization field counter 608 begins to count the number of words received by data FIFO 402 and resets an internal timer. When counter 608 reaches a predetermined value corresponding to the beginning of the dead zone field 508, the counter transmits a signal on control bus 626 instructing write controller 602 and read controller 604 to resynchronize.

Referring now to FIGS. 6 and 7, write controller 602 preferably operates in accordance with a state machine 700 having three states: a reset state 702, a write suspend state 704 and a write state 706. Initially, write controller 602 is at reset state 702. Write controller 602 may be reset for any number of reasons, such as upon receipt of power, when data FIFO 402 is cleared, when a node is initialized prior to commencing communications over the network and the like.

At reset state 702, write controller 602 initially sets the WEN control line 610 inactive, thus preventing the writing of data into data FIFO 402 until the necessary conditions are present. Upon completion of these initialization procedures, write controller 602 advances to write suspend state 704 as shown by state transition line 708.

While write controller 602 is at write suspend state 704, it maintains WEN control line 610 inactive while monitoring PAF flag 614 and control bus 626. If PAF flag 614 is active, then data level 620 is above the upper threshold 618 as discussed above. Under such conditions, write controller 602 continues to remain in the write suspend state 704 unless and until either a frame packet is received or data level 620 falls below upper threshold 618. When data level 620 is below upper threshold 618 and PAF flag 614 is thus inactive, write controller 602 will allow data to be written into the data FIFO 402. Thus, when a frame packet is presented at the input of data FIFO 402 or when data FIFO 402 is not almost full, then write controller 602 advances to write state 706 as shown by state transition line 710.

At write state 706, write controller 602 sets WEN line 610 active to enable writing of data into data FIFO 402. The writing of data continues until two conditions simultaneously occur. If counter 608 (via control bus 626) indicates that dead zone field 508 is currently present at the input to data FIFO 402 which means that the payload field 506 has been completely written into the FIFO) and the data level 620 is above the upper threshold 618 (and is thus above the desired optimal range), the writing of data is suspended. Thus, if payload field 506 of the current frame packet is completely written into FIFO 402 and the FIFO is almost full, write controller 602 advances to write suspend state 704 as shown by state transition line 712.

Referring now to FIGS. 6 and 8, read controller 604 preferably operates in accordance with a state machine 800 having three states: a reset state 802, a read suspend state 804 and a read state 806. Initially, read controller 604 is at reset state 802. Read controller 604 may be reset for any number of reasons such as those discussed above with respect to write controller reset state 702. At reset state 802, read controller 604 sets REN control line 612 inactive to prevent the reading of data from FIFO 402 until the necessary conditions are met. Upon completion of the reset/initialization procedures, read controller 604 advances to read suspend state 804 as shown by state transition line 808.

While read controller 604 is at read suspend state 804, it maintains REN control line 812 inactive while monitoring PAE flag 616 and control bus 626. If PAE flag 616 is active, then data level 620 is below lower threshold 622 as discussed above. Under such conditions, the read controller 604 continues to remain in read suspend state 804 unless a frame packet is received or data level 620 rises above lower threshold 622. When either of those events occurs, read controller 604 advances to read state 806.

At read state 806, read controller 604 sets REN control signal 612 active to enable reading of data from FIFO 402. So long as counter 608 indicates, again, via control bus 626, that dead zone field 508 is currently present at the input to the data FIFO 402 (i.e., the payload field 506 has been completely written into the FIFO) or data level 620 is in the optimal range, reading of data remains enabled and data will continue to be read from data FIFO 402.

However, if counter 608 indicates that dead zone field 508 is currently present at the input to data FIFO 402 and data level 620 is simultaneously below lower threshold 622 (and is thus below the optimal range), the reading of data is suspended. Thus, if payload field 506 of the currently-presented frame packet is completely written into FIFO 402 and the FIFO 402 has become almost empty, read controller 602 advances to read suspend state 804 as shown by state transition line 812.

Write and read controllers 602,604 interoperate to maintain data level 620 within between upper threshold 618 and lower threshold 622. As noted above, write and read controllers 602,604 perform their functions in response to an internally-generated synchronization instruction based upon the states of PAF and PAE flags 614,616 and the portion of frame packet 502 present at the input of data FIFO 402.

Upon receipt of a frame synchronization field counter 608 begins counting the data words which follow that field (i.e., the words in payload field 506). When counter 608 reaches a predetermined number of words representing the end of payload field 506 (and the beginning of dead zone field 508), counter 608 issues a resynchronization signal over control bus 626 which causes write and read controllers 602,604 to check the status of the PAE and PAF flags. If another frame packet is not subsequently received, counter 608 continues to reset and increment, each time generating a resynchronization instruction which causes word resynchronization subsystem 404 to resynchronize. In other words, counter 608 begins incrementing when a frame synchronization field 504 is received and, upon reaching its maximum predetermined value, counter 608 resets and begins again in anticipation of receiving another frame synchronization field 504. Thus, resynchronization is guaranteed to occur regardless of whether a frame synchronization field 504 is actually received.

If, during resynchronization, write and read controllers 602,604 determine that data level 620 is between upper and lower thresholds 618,622, then controllers 602,604 will allow continuous reading and writing of data through the data FIFO. However, if data level 620 is either above upper threshold 618 or below the lower threshold 622, then read and write controllers 602,604 will momentarily suspend writing or reading of data as needed to restore data level 620 to within the optimal range.

Upon initialization or invocation of a reset condition, write and read controllers 402,404 are placed in reset states 702,802, respectively. While the controllers are in their respective reset states, initializer 606 sets the values of upper threshold 618 and lower threshold 622 at respective predetermined values to define an optimal range for data level 620. By setting those thresholds, a desired optimal range for data level 620 is established prior to the presentation of valid data at the input of data FIFO 402.

It is important that data level 620 is built-up to within the established optimal range before valid data is received to avoid the immediate slippage of words (i.e., during the time delay that would be incurred in filling a completely empty FIFO to at least the almost empty level). During periods when no nodes are transmitting onto the network, the master node may generate fill frames or frame packets having payload fields 506 that contain no valid data. Such fill frames may be received and stored by all the nodes in the network implementing the word resynchronization subsystem 404 of the present invention. Thus, although no valid data is received, the fill frames are nonetheless stored in the data FIFO 402, thereby maintaining data level 620 in the optimal range prior to the receipt of valid data (i.e., prior to normal communications).

Preferably, an optimal range for data level 620 is chosen based upon the expected deviations between the source and destination node clocks in the network. In a preferred embodiment of the present invention, each node has a local oscillator which operates at 131.072 MHz±25 ppm (parts per million). The local clock of each node is preferably configured to operate at half the oscillator rate. Thus, the tolerance of each node's local clock is (131.072÷2×25) or 1638 words/second. That is, variations in the frequency of each node's local clock cause corresponding variations in data transmission by as much as 1638 words/second. The largest difference between two nodes on the network will occur when a node containing a local oscillator running at 131.072+25 ppm is communicating with another node containing a local oscillator running at 131.072−25 ppm. This worst case scenario will result in an error condition of (2×1638) or 3276 words/second. In that scenario, a slip of one word can be expected every 305.25 μs.

Note, however, that in addition to instructing the controllers to resynchronize upon receipt of the dead zone, counter 608 also instructs the write and read controllers to resynchronize when no frame synchronization field 504 is received at all. That is, counter 608 continually resets and increments (up to the expiration of its internal 125 μs timer) regardless of whether a frame synchronization field 504 appears at the input of the data FIFO 402. This periodic resynchronization continues indefinitely and is interrupted only when a frame synchronization field 504 is received. Thus, the longest period of time between resynchronizations is when a frame synchronization field 504 is received immediately prior to the timer expiring. For example, if the packet frame contains 8125 words and lasts 125 μs and dead zone field 508 is 100 words in length, then the timer will indicate the beginning of the dead zone at (8125−100 words)×15 nanoseconds) or 120.4 μs, with the longest duration between resynchronizations being (120.4×2) or 240.8 μs.

Because word resynchronization is preferably performed every frame, or once every 125 μs, which is less than the time of an expected word slip of 305 μs, no word slips should occur. As a result, an optimal data FIFO level 620 may be only a few words. In a preferred embodiment, upper threshold 618 and lower threshold 622 are determined based upon how often data FIFO 402 will be serviced by the controllers, the anticipated deviations between the source and destination clocks, the hysteric behavior of the subsystem, as well as the data FIFO's sensitivity to underflow and overflow conditions. However, as one skilled in the relevant art would find apparent, other criteria may also be considered. In a preferred embodiment, the capacity of data FIFO 402 is significantly larger than upper threshold 618, to provide protection against overflow conditions. However, if the data FIFO level becomes too large, there will be significant delay through the node. Although it is desirable to maintain the data level 620 as low as possible to reduce the delay through the node, to provide protection against underflow conditions there must be a data level sufficient to prevent loss of data in light of the above factors. These concerns are balanced against ring latency requirements to obtain an optimal range for data level 620. In a preferred embodiment, the optimal data level 620 is set at an 8 word depth, with the associated upper and lower thresholds 618, 620 set at 8 and 12 words, respectively. A data FIFO level of 8 words will not cause significant delay through the node (8×15 ns=120 ns), while providing a conservative number of words to prevent slippage (despite the fact that none should occur given the above calculations).

Note that writing of data is suspended only during the receipt of the dead zone field 508 when only fill frames (non-valid data) are received. As a result, some, all, or none of the dead zone field 508 will be stored in the data FIFO 402. The portion that is stored is the amount necessary to guarantee that the frame packet which is subsequently read from the data FIFO 402 and transmitted at the rate of the local clock will average 125 μs in length. Furthermore, the clock signal transmitted to another node will not contain jitter or wander components of the recovered source node's clock.

3. Frame Synchronization Subsystem

Figure 9:
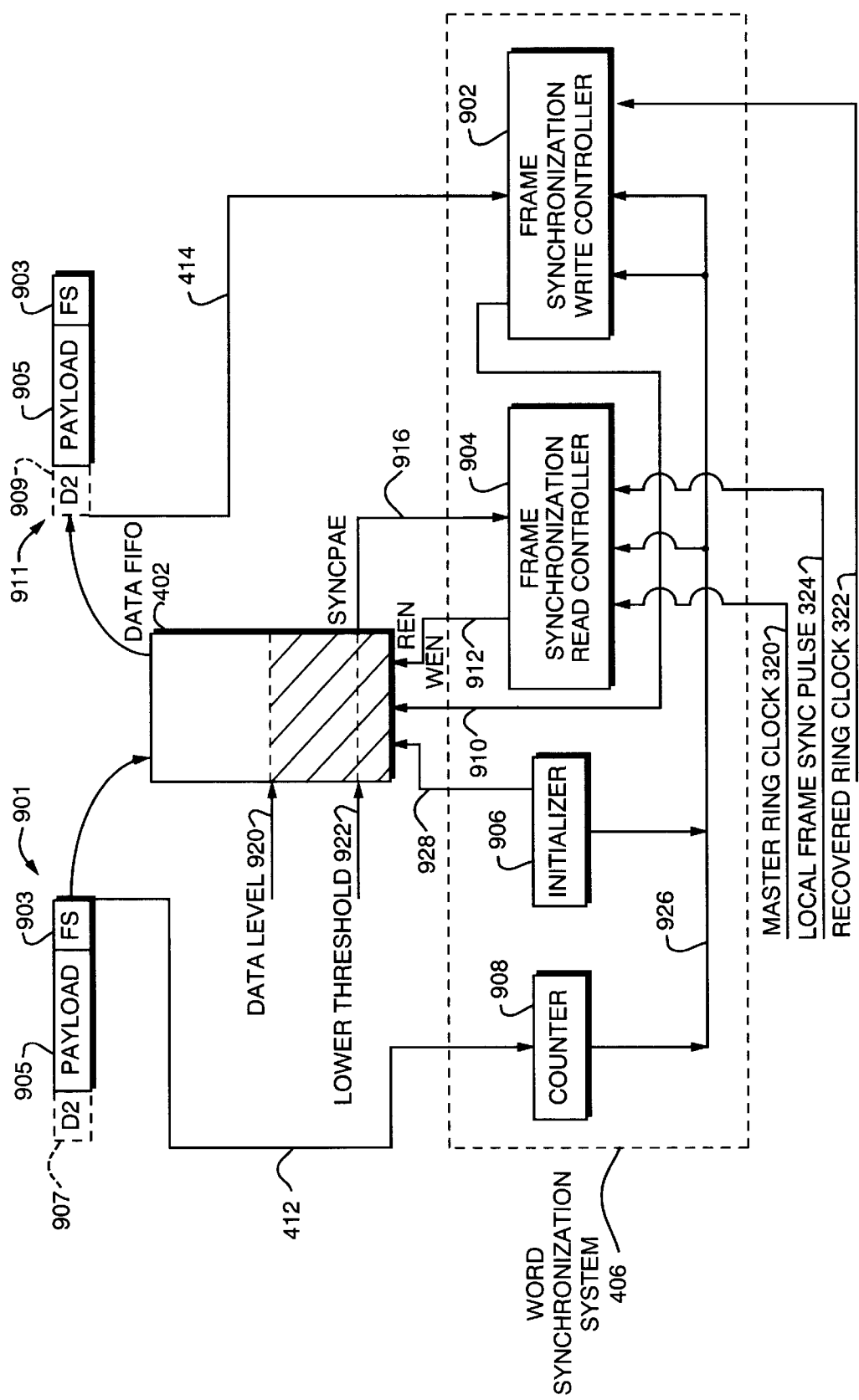
FIG. 9 is a block diagram showing the frame synchronization subsystem of the distributed synchronization system of the present invention.
Figure 10:
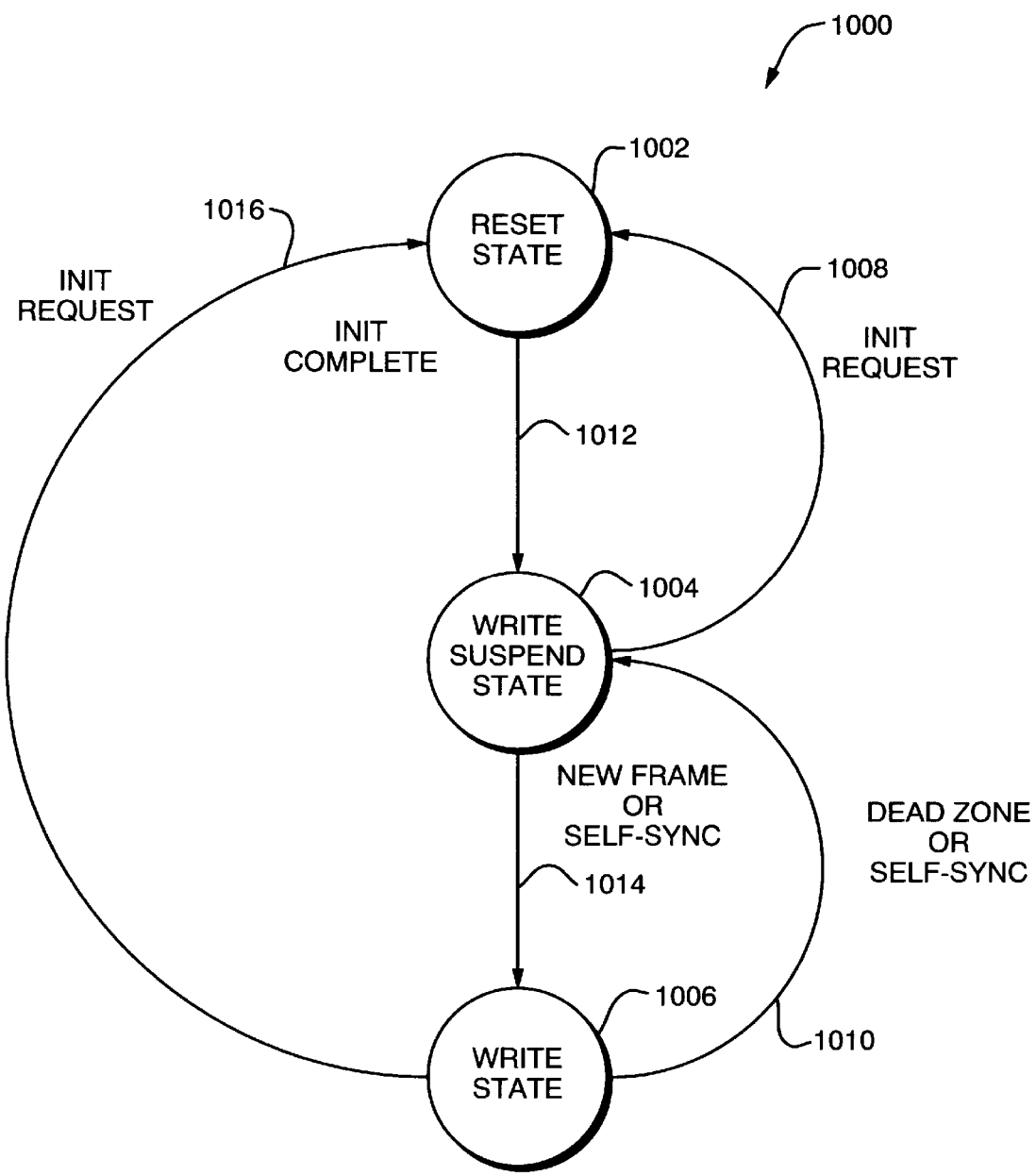
FIG. 10 is a state diagram illustrating the functions performed by the write controller of the frame synchronization subsystem of the present invention.
Figure 11:
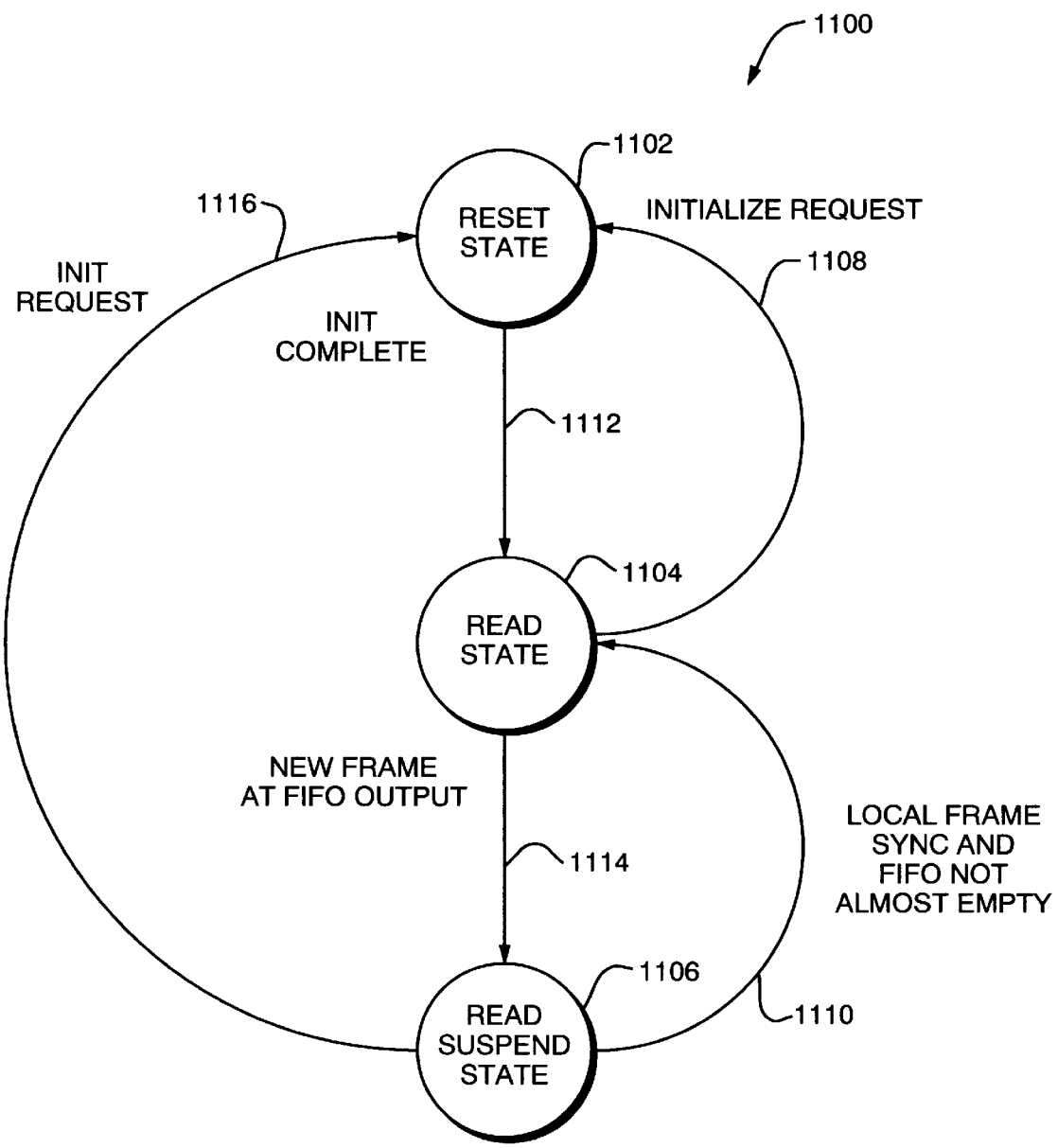
FIG. 11 is a state diagram illustrating the functions performed by the read controller of the frame synchronization subsystem of the present invention.

With reference now to FIGS. 9–11, the operation of frame synchronization subsystem 406 is described. FIG. 9 is a functional block diagram of subsystem 406 and data FIFO 402 of the distributed synchronization system 326 of the present invention. Frame synchronization subsystem 406 includes a write controller 902, a read controller 904, an initializer 906, and a counter 908. Write controller 902 controls writing of data into data FIFO 402 via a write enable (WEN) signal line 910. Read controller 904 controls reading of data from data FIFO 402 via a read enable (REN) signal line 912. When the REN and WEN control lines are active, the data FIFO 402 is enabled to read and write data, respectively.

A lower data threshold 922 is represented by a synchronization programmable almost empty (SYNCPAE) flag 916. When data level 920 is at or below lower threshold 922, SYNCPAE flag 916 is in its active state. Conversely, when data level 920 is above lower threshold 922, the SYNCPAE flag is in its inactive state. Lower threshold 922 is initially set by an initializer 906 via initialization control line 928 to a predetermined level (discussed below).

Frame synchronization subsystem 406 generates an initialization frame when the network is first initialized. Each non-master node receives and retransmits the initialization frame, causing each node to successively initialize its nodal switch. When the initialization frame returns to the master node, the master node itself then initializes with the knowledge that all other nodes in the network are ready to commence inter-nodal communications. The master node then transmits a frame synchronization field designating the frame boundaries around the ring.

The determination of which field of frame packet 901 is present at the FIFO input is made by a counter 908 via a monitor line 412. When counter 908 detects a frame synchronization field 903, it counts up to the dead zone field 907 then issues a self-synchronization command to write controller 902 to begin or suspend write operations. When counter 908 does not detect a frame synchronization field 903 (and thus a dead zone field 907 as well) during a frame transmission, the counter issues a self-synchronization command to write controller 902. Based upon the frame packet field and the invocation of self-synchronization, counter 908 generates a signal on control bus 926 instructing write controller 902 to write or not write the received fields into data FIFO 402.

Frame synchronization subsystem 406 dynamically adjusts the amount of data stored in data FIFO 402 to accommodate variations in ring latency. If, for example, the ring latency is increased suddenly due to a node failure and subsequent loop-back operations, then data level 920 in data FIFO 402 will either rise or fall depending upon the time of the failure in relation to the frame that is being processed by the FIFO. However, frame synchronization subsystem 406 automatically recovers because the next frame synchronization field 903 that appears at the output of data FIFO 402 does so significantly before the occurrence of the local frame synchronization pulse 324. As a result, reads are suspended while data FIFO 402 is filled with data, thereby automatically raising the data level by the amount that it was previously depleted.

Referring to FIGS. 9 and 10, write controller state machine 1000 has three states: a reset state 1002, a write suspend state 1004, and a write state 1006. Initially, write controller 902 is at reset state 1002.

Write controller 902 may be reset for any number of reasons, such as when initializer 906 sets the lower threshold level 922, upon the initial application or an interruption of power to the frame synchronization subsystem 406, and the like.

At reset state 1002, write controller 902 sets the WEN control line 910 inactive to prevent the writing of data into data FIFO 402 until the necessary conditions are met. Upon completion of the initialization procedures, write controller 902 advances to write suspend state 1004 as shown by state transition line 1012.

While write controller 902 is at write suspend state 1004, it maintains WEN control line 910 inactive to prevent writes from occurring. During this time, counter 908 monitors the input of the data FIFO 402 to determine which portion of frame packet 901 is currently present. When counter 908 detects a frame synchronization field 903 or does not detect a frame packet during a frame transmission, counter 908 invokes a self-synchronization operation, instructing write controller 902 to begin writing data into the data FIFO 402. When this occurs, write controller 902 transitions from write suspend state 1004 to write state 1006 as shown by state transition line 1014.

At write state 1006, write controller 902 sets WEN control line 910 active to begin writing the contents of any received frame packets into data FIFO 402. The writing of the frame packet fields continues until counter 908 indicates that dead zone field 907 is currently present at the input to the data FIFO 402. On the other hand, if counter 908 did not detect a frame packet during a frame transmission, then write controller 902 will write fill frames into data FIFO 402 while in write state 1006. In this circumstance, the counter 908 will still indicate the point at which a dead zone 907 would normally have appeared at the input of data FIFO 402.

In other words, regardless of whether a frame packet or fill frames are being written into data FIFO 402, write controller 902 will transition to write suspend state 1004 during a portion of the frame transmission. Thus, when dead zone field 907 of the current frame packet 901 is detected at the input to data FIFO 402 or when self-synchronization occurs, write controller 902 advances to write suspend state 1004 as shown by state transition line 1010. As a result, write controller 902 writes only the frame synchronization and payload fields (and not the dead zone field) into data FIFO 402. If no frame packet is presented to data FIFO 402, then write controller 902 periodically transitions between write state 1004 and write suspend state 1006.

Referring to FIGS. 9 and 11, read controller state machine 1100 has three states: a reset state 1102, a read state 1104; and a read suspend state 1106. Initially, read controller 904 is at reset state 1102. At the reset state 1102, read controller 904 sets the read enable REN control line 912 inactive to prevent the reading of data from data FIFO 402 until the necessary conditions are present. Upon completion of the initialization procedures, read controller 904 advances to read state 1104 as shown by state transition line 1112.

While read controller 904 is at read state 1104, it sets the REN control line 912 active while it monitors the output of data FIFO 402. This will maintain data FIFO 402 at an optimal minimal level, somewhere close to empty, until a frame packet has been received and stored in the FIFO. When the controller 904 determines that frame synchronization field 903 is about to be read from the data FIFO 402, read controller 904 advances to read suspend state 1106 as shown by state transition line 1114.

In read suspend state 1106, read controller 904 sets the REN control line 912 inactive to stop the reads from the data FIFO 402 from continuing. Read controller 904 then waits until the simultaneous occurrence of two conditions: the receipt of the local frame synchronization pulse 324 and the accumulation of data in FIFO 402 such that data level 920 is above the lower threshold 922. If the local frame synchronization pulse 324 occurs and the data FIFO 402 is not almost empty, then there is a sufficient amount of data in the data FIFO 402 to safely read data without causing underflow conditions. When data level 920 is below lower threshold 922, read controller 904 remains in the read suspend state 1106. On the other hand, when the data level 920 is above the lower threshold 922, the read controller 904 will allow data to be read from data FIFO 402 upon receipt of a local frame synchronization pulse 324. Thus, when a frame packet 911 is presented at the output of data FIFO 402 and data level 920 is not almost empty, then read controller 904 advances to read state 1104 as shown by state transition line 1110.

If a local frame synchronization pulse 324 occurs prior to the time the data level 920 exceeds lower threshold 922, read controller 904 will remain in read suspend state 1106 and continue to accumulate data until the next occurrence of the local frame synchronization pulse 324. Thus, when a the local frame synchronization pulse 324 occurs and data level 920 is above lower threshold 922, read controller 904 transitions to read state 1104, releasing frame synchronization field 903 and payload field 905. When the next frame synchronization field appears at the output of data FIFO 402, read controller 904 will return to the read suspend state 1106 until the next local frame synchronization pulse 324 occurs.

Write and read controllers 902,904 perform their functions asynchronously with respect to each other. However, their functions are coordinated to ensure that a frame packet is released from the implementing master node 102*a* at such time that the ring latency will be an integer multiple of frame packets. Write and read controllers 902, 904 maintain an optimal amount of frame packet fields in data FIFO 402 so that a frame packet is ready for transmission upon the occurrence of a pulse while not causing excessive delay through the master node or exposing the node to potential underflow conditions. This coordinated operation of the write and read controllers is discussed below.

When write and read controllers 902,904 are in their respective reset states, WEN and REN control lines 910, 912 are set inactive to prevent any data from being stored in, or retrieved from, data FIFO 402. After initialization, write controller 902 advances to write suspend state 1004 and read controller 904 advances to read state 1104. No data is written into the data FIFO 402 until either a frame synchronization field 903 is detected at the input of data FIFO 402 or a self-synchronization signal is received. However, data is read from data FIFO 402, although initially no valid data will be presented at the output of the FIFO.

If a frame synchronization field 903 is not detected within a predetermined time equivalent to a frame transmission (i.e., 125 μs), then counter 908 generates a self-synchronization signal. This causes write controller 902 to advance to write state 1006, while read controller 904 remains in read state 1104. Thus, any data received will be written into and read from the data FIFO 402 with little or no delay since the data FIFO is essentially empty.

Since the write controller 902 and the read controller 904 operate asynchronously, data level 920 in the data FIFO 402 may drift upward. To avoid having an unnecessary number of fill frames in data FIFO 402 when a frame packet containing valid data is received, write controller 902 preferably periodically ceases writes operations while the read controller 904 continues read operations. That is, if a frame synchronization field 903 is not detected while the write controller 902 is in the write state 1006 and the counter 908 is incrementing, then write controller 902 transitions to the write suspend state 1004, allowing read controller 904 to operate to reduce data level 920 during the time that dead zone field 907 is presented to data FIFO 402. Write controller 902 will preferably transition between those two states indefinitely until a frame synchronization field 903 is received.

Upon receipt of a frame synchronization field 903, counter 908 will reset and begin to count the number of words written into data FIFO 402. Write controller 902 will either remain in write state 1006 or transition to write state 1006 from the write suspend state 1004. When counter 908 reaches a predetermined value indicating that frame synchronization field 903 and payload field 905 have been written into data FIFO 402 and dead zone field 907 is currently present at the input of data FIFO 402, then counter 908 instructs write controller 902 to cease writing into data FIFO 402 (since the received dead zone field 907 is not retransmited by the subsystem 406).

When frame synchronization field 903 appears at the output of data FIFO 402, read controller 904 advances to read suspend state 1106, causing data FIFO 402 to start filling up. Upon the occurrence of a local frame synchronization pulse 324, read controller 904 reads the frame synchronization field 903 and the payload field 905 from data FIFO 402. Read controller 904 continues to read data from the FIFO until it detects a new frame synchronization field 903 presented at the output of the data FIFO 402. When this occurs, the read controller ceases to read from the FIFO, causing fill frames to be added to the frame packet until it contains a sufficient number of words to precisely equal a frame transmission. Thus, a new dead zone 909 is effectively created by the ceasing of read operations. This guarantees that each frame packet 911 transmitted from the master node 102*a* contains an exact predetermined number of words for a frame transmission.

Since write controller 902 does not write (i.e., discards) the dead zone field 907 while read controller 904 is performing read operations, data FIFO 402 will be depleted by an amount of words approximately equivalent to the size of the dead zone field 907. Likewise, when read controller 904 is in read suspend state 1106 while write controller 902 is in the write state 1006, data level 920 will increase by the size of the dead zone field 907.

Thus, to avoid dataflow errors from occurring, data FIFO 402 must be maintained with a number of words equal to at least the number of words contained in dead zone field 907.

An additional requirement is that data FIFO 402 must contain a quantity of data, referred to as the "remainder", that is equivalent to the difference between the ring latency and an integer multiple of the frame. If the remainder is less than the size of dead zone field 907, then the remainder plus a complete frame of data (payload field 905 and frame synchronization field 903) is stored in the FIFO since the data level 920 will be below the lower threshold 922 when a pulse 324 occurs, causing the read controller 904 to stay in the read suspend state 1106 until a following pulse 324 after another frame of data has been written into the FIFO.

On the other hand, if the remainder is greater than the size of dead zone field 907, then only the remainder will be stored in the data FIFO since the remainder number of words in the FIFO 402 will always be above the lower threshold 922 set at the size of the dead zone field 907. As a result, SYNCPAE flag 916 will never become active once a frame packet has been received.

In a preferred embodiment of the present invention, the distributed synchronization system 326 comprises both a frame synchronization subsystem 406 implemented operating in a master node and a word resynchronization subsystem 404 implemented in each non-master node. However, as one skilled in the relevant art would find apparent, distributed synchronization system 326 may be implemented with either the frame synchronization subsystem 406 or the word resynchronization subsystem 404 individually.

It is noted, however, that a network implementing both subsystems enables continued, robust synchronized communications to occur between asynchronous nodes in the network while preventing dataflow errors and without contributing excessively to network latency.

As a result, in a preferred embodiment of the present invention, each network node is implemented with both subsystems. Accordingly, the size of FIFO 402 is preferably large enough to accommodate both of these implementations. Thus, FIFO 402 preferably has a byte capacity which is slightly larger than the amount of data contained within one frame. This will provide an implementing node with the capacity of acting as a master node and performing frame synchronization. Alternatively, the node may be a non-master node, performing solely word resynchronization. Furthermore, if such a node is implemented in a network system that is not distributed, frame synchronization is not required, thereby enabling the FIFO 402 to be considerably smaller.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A distributed synchronization system for use in a node of an expandable telecommunications system including a plurality of nodes interconnected by an inter-nodal network, with one of said nodes being a master node, the system, comprising:

a synchronization data memory implemented in a master node and each of said nodes which are non-master nodes for storing predetermined portions of an inbound frame packet received from a source node and from which information is retransmitted to a destination node on the network;

a frame synchronization subsystem implemented in said master node, and connected in communicating relationship with said memory, configured to release an outbound frame packet at the beginning of an independently-determined frame cycle, based upon the occurrence of a local frame synchronization pulse, and wherein said frame packets include a frame synchronization field indicating the beginning of a new frame packet, a payload field containing valid data and a dynamically-adjustable dead zone comprising a non-valid data field; and a word resynchronization subsystem implemented in said master node and each non-master node and connected in communicating relationship with said memory and configured to control storage of said predetermined portions using a recovered source node clock signal and to control retransmission of said information according to a local clock signal, such that each non-master node receives a frame packet at predetermined interval of time whereby dataflow errors due to phase differences in source and destination nodal clocks are substantially avoided.

2. The synchronization system of claim 1 wherein the frame synchronization subsystem comprises:

a counter for generating a signal indicative of which portion of the inbound frame packet is present at an input to said memory;

an initializer connected to said memory for establishing a threshold data level of said memory;

a read controller connected to said memory and responsive to a signal indicative of whether a current data level of said memory is greater than said threshold data level to alternately enable or suspend reading of information from said memory, a master clock signal for reading information from said memory for inclusion in said outbound frame packet, and a frame synchronization pulse which is derived from a network reference clock and is used to trigger the release of said outbound frame packet;

a write controller connected to said memory and responsive to said recovered source node clock signal to alternately enable or suspend writing of information into said memory;

said counter, initializer and read and write controllers connected in communicating relationships by a control bus.

3. The synchronization system of claim 1 wherein the word resynchronization subsystem further comprises:

a counter for counting a number of words that have been written into the data memory following receipt of said frame synchronization field and resetting a timer, for generating a signal indicative of which portion of the inbound frame packet is present at an input to said memory, and to instruct a read controller and a write controller to resynchronize when the counter reaches a predetermined value corresponding to the presence of said non-valid data field at said memory input;

an initializer connected to said memory for establishing upper and lower threshold data levels of said memory;

said read controller connected to said memory and responsive to a signal indicative of whether a current data level of said memory is greater than said lower threshold data level, and a master clock signal for controlling the reading of information from said memory;

said write controller connected to said memory and responsive to a signal indicative of whether a current data level of said memory is less than said upper threshold level, and a recovered source node clock signal for controlling the writing of information into said memory;

wherein said read and write controllers function in cooperating relationship to maintain the data level of said memory within an optimal range between said upper and lower threshold levels;

said counter, initializer and read and write controllers are connected in communicating relationships by a control bus.

4. The synchronization system of claim 3 wherein said read and write controllers function to substantially compensate for phase differences between said recovered source node clock signal and said local clock signal by receiving and storing data in accordance with said recovered source node clock signal and retrieving and retransmitting the data in accordance with said local clock signal.

5. A telecommunications switch which is operable as a node in an expandable telecommunications system, said switch comprising:

one or more nodal switches for dynamically connecting or disconnecting communication paths with respect to various ones of a plurality of ports and transmitting and receiving packetized information over an inter-nodal network, said inter-nodal network for providing communications between said telecommunications switch and other nodes associated with said system; and a word resynchronization subsystem including a memory and a controller, wherein said memory is implemented in a master node and each non-master node for storing predetermined portions of an inbound frame packet received from a source node and from which information for inclusion in an outbound frame packet is retrieved, and said controller for regulating a flow of information through said memory in response to a time-varying data level of the memory, and maintaining said data level within a predetermined optimal range; and frame synchronization subsystem implemented in said master node, and connected in communicating relationship with said memory, configured to release an outbound frame packet at the beginning of an independently-determined frame cycle, based upon the occurrence of a local frame synchronization pulse, and wherein said frame packets include a frame synchronization field indicating the beginning of a new frame packet, a payload field containing valid data and a dynamically-adjustable dead zone comprising a non-valid data field.

6. A method of synchronizing data in a node of an expandable telecommunications system, the system comprising a plurality of switching nodes interconnected by an inter-nodal network with one of said nodes being a master node, said method comprising the steps of:

(a) at the master node, transmitting a first frame packet at the beginning of an independently-determined frame cycle:

(b) at each frame packet, a frame synchronization field indicating the beginning of said frame packet, a payload field including a number of subpackets, each containing data for transmission among nodes served by the inter-nodal network, and a dynamically-adjustable dead zone for synchronization purposes, comprising a non-valid data field;

(c) at a first non-master node, storing in a memory predetermined portions of said frame packet, and retrieving from said memory information which is to be retransmitted to another non-master node or the master node on the network, and controlling said retransmission of said information using a local frame synchronization pulse, such that each non-master node receives a frame packet at predetermined interval of time whereby data flow errors due to phase differences in source and destination nodal clocks are substantially avoided; and (d) repeating step (c) at each non-master node until said first frame packet returns to said master node.

* * * * *